United States Patent
Fielder et al.

(10) Patent No.: US 10,846,761 B2
(45) Date of Patent: *Nov. 24, 2020

(54) E-MAIL BASED DYNAMIC ADVERTISING

(71) Applicant: iHeartMedia Management Services, Inc., San Antonio, TX (US)

(72) Inventors: Matthew Fielder, Verona, NJ (US); Pablo M. Calamera, New York, NY (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/135,974

(22) Filed: Sep. 19, 2018

(65) Prior Publication Data

US 2019/0019224 A1   Jan. 17, 2019

Related U.S. Application Data

(63) Continuation of application No. 13/923,966, filed on Jun. 21, 2013, now Pat. No. 10,108,987.

(51) Int. Cl.
*G06Q 30/02* (2012.01)

(52) U.S. Cl.
CPC .............................. *G06Q 30/0277* (2013.01)

(58) Field of Classification Search
CPC combination set(s) only.
See application file for complete search history.

(56) References Cited

U.S. PATENT DOCUMENTS

| | | | |
|---|---|---|---|
| 6,772,203 B1 * | 8/2004 | Feiertag | G06F 16/957 709/219 |
| 7,379,980 B1 | 5/2008 | Gilbert | |
| 7,568,016 B2 | 7/2009 | Gilbert | |
| 7,877,677 B2 | 1/2011 | Wyler et al. | |
| 7,925,694 B2 | 4/2011 | Harris | |
| 8,082,332 B2 | 12/2011 | Gilbert | |
| 8,090,877 B2 | 1/2012 | Agarwal et al. | |
| 8,244,822 B1 | 8/2012 | Lowry et al. | |
| 8,364,682 B1 | 1/2013 | Gershony et al. | |

(Continued)

OTHER PUBLICATIONS

European Search Report for Application No. 14813123.8 dated Jan. 30, 2017, 8 pages.

(Continued)

*Primary Examiner* — Gautam Ubale

(57) ABSTRACT

A method includes receiving, at a proxy server, a first request for content from a computing device. The first request includes an identifier that uniquely identifies a user and an e-mail. The method also includes, in response to receiving the first request, sending a second request to a first server. The second request includes at least a portion of a cookie associated with the identifier. The method also includes receiving the content at the proxy server from the first server and sending the content from the proxy server to the computing device. The method further includes, subsequent to receiving the first request, determining, at the proxy server, information regarding resolution of dynamic links associated with the content. The information includes a count of a number of times that the content has been accessed outside a time to live (TTL) of the cookie by web browsers or by e-mail clients.

20 Claims, 7 Drawing Sheets

(56) References Cited

U.S. PATENT DOCUMENTS

| | | | |
|---|---|---|---|
| 8,423,656 B2 | 4/2013 | Lowry et al. | |
| 2002/0007393 A1 | 1/2002 | Hamel | |
| 2002/0016736 A1 | 2/2002 | Cannon et al. | |
| 2002/0072965 A1 | 6/2002 | Merriman et al. | |
| 2002/0082923 A1 | 6/2002 | Merriman et al. | |
| 2004/0249709 A1 | 12/2004 | Donovan et al. | |
| 2005/0222903 A1* | 10/2005 | Buchheit | G06Q 30/0256 705/14.54 |
| 2007/0239528 A1 | 10/2007 | Xie et al. | |
| 2008/0162260 A1 | 7/2008 | Rohan et al. | |
| 2008/0178162 A1 | 7/2008 | Sanford et al. | |
| 2008/0215426 A1 | 9/2008 | Guldimann et al. | |
| 2009/0125719 A1 | 5/2009 | Cochran et al. | |
| 2009/0259627 A1* | 10/2009 | Petrov | G06Q 30/02 |
| 2010/0058293 A1 | 3/2010 | Dunagan et al. | |
| 2011/0066692 A1 | 3/2011 | Ciancio-Bunch et al. | |
| 2011/0184814 A1 | 7/2011 | Konkol et al. | |
| 2011/0314114 A1 | 12/2011 | Young, III et al. | |
| 2012/0042025 A1 | 2/2012 | Jamison et al. | |
| 2012/0059906 A1 | 3/2012 | Ciancio-Bunch et al. | |
| 2012/0095850 A1 | 4/2012 | Hamel | |
| 2012/0116896 A1 | 5/2012 | Holloway et al. | |
| 2012/0124206 A1* | 5/2012 | Butler | H04L 67/02 709/224 |
| 2013/0036434 A1 | 2/2013 | Shkedi et al. | |
| 2013/0041764 A1 | 2/2013 | Donovan et al. | |
| 2013/0073693 A1* | 3/2013 | Harada | H04L 63/08 709/219 |
| 2014/0244406 A1 | 8/2014 | Garcia-Martinez et al. | |

OTHER PUBLICATIONS

International Search Report and Written Opinion for International Application No. PCT/US2014/42503 dated Oct. 24, 2014, 10 pages.
"Defeat browser caching," Double Click for Publishers, <http://support.google.com/dfp_premium/bin/answer.py?hl=en&answer=1116933> retrieved on May 16, 2013, 2013 Google, Inc., 2 pages.

* cited by examiner

E-MAIL BASED DYNAMIC ADVERTISING

CROSS REFERENCE TO RELATED APPLICATIONS

The present application claims priority from and is a continuation of U.S. Non-Provisional patent application Ser. No. 13/923,966, filed Jun. 21, 2013, and entitled "E-MAIL BASED DYNAMIC ADVERTISING," the contents of which are expressly incorporated herein by reference in their entirety.

BACKGROUND

Many web based advertising systems require client devices to support scripting languages and local storage of state information (e.g., cookies). For example, scripting and cookies may be used to implement dynamic advertising. Because most web browsers support scripting and cookies, web based advertising systems may expect that a client device with a web browser is used to access advertisements. If a client device uses an application that does not support scripting or cookies, the web based advertising may not be displayed correctly at the client device. For example, because electronic mail (e-mail) clients may not support scripting or cookies, Hypertext Markup Language ("HTML") formatted e-mails including dynamic advertising may not be displayed correctly. For example, in situations where several advertising campaigns are being implemented at the same time or when one advertising campaign ends and another campaign begins, an e-mail client may display an image for one advertisement (e.g., soft drink A) but a hyperlink or subject line for another advertisement (e.g., soft drink B).

For at least the foregoing reasons, a web based advertising system may not officially support and/or may explicitly discourage e-mail/newsletter advertising campaigns. One workaround to this problem is to implement redundant advertising campaigns—a first campaign using a web based advertising system for dynamic browser advertisements and a separate campaign using a dedicated e-mail/newsletter advertising system for static e-mail advertisements. However, managing advertising inventory across multiple campaigns may be cumbersome, and the inability to render dynamic advertisements in e-mail clients may reduce advertising effectiveness (e.g., conversion rate).

SUMMARY

Systems and methods of implementing e-mail based dynamic advertising are disclosed. In accordance with the described techniques, an advertiser can create a single advertising campaign to provide dynamic advertising that is accessible via web browsers and via e-mail clients. The e-mail clients may use a proxy server for scripting and cookie storage functionality.

For example, an administrator or advertiser may create an advertising campaign. Creating the advertising campaign may include providing advertising data (e.g., images, videos, webpages, etc.) and advertising targeting parameters to a web based advertising server. The advertising campaign may include dynamic advertising. In dynamic advertising, a webpage or an e-mail includes a link (e.g., hyperlink) that is dynamically resolved by a web browser or e-mail client when the webpage or e-mail is viewed. Resolution of the dynamic link may result in a static link to a specific image file or webpage. When accessed via a web browser, resolution of dynamic advertising links uses cookies and dynamic scripting functionality of the web browser. When accessed via an e-mail client, the proxy server may provide cookie and dynamic scripting functionality.

To illustrate, a user may have an e-mail account that is associated with an e-mail address. An e-mail (or electronic newsletter) may be sent to the user's e-mail address. The e-mail may include a dynamic link, such as an image link or a jump link. The dynamic link may point to the proxy server and may include an identifier that uniquely identifies the user, the e-mail, and/or an advertisement. However, the dynamic link may not be resolved upon receipt of the e-mail. Instead, the dynamic link may be resolved when the e-mail is rendered (e.g., displayed by an e-mail client application at a client device, such as a phone, a personal computing device, etc.) for the first time. Such rendering may occur a period of time (e.g., hours, weeks, days, months, etc.) after receipt of the e-mail. When the dynamic link is resolved, the e-mail client sends the identifier to the proxy server as part of a request. The proxy server may determine if a cookie (e.g., state information) associated with the identifier is available. If a cookie is not available, the proxy server may generate and initialize a cookie. The proxy server transmits a second request that includes the cookie to an advertising server. The advertising server returns advertising content to the proxy server in response to the second request. For example, the advertising content may include a static link to an image. The proxy server forwards the static link received from the advertising server to the e-mail client, thereby resolving the dynamic link for the e-mail client. The e-mail client may then use the static link to retrieve the image and display the image within the e-mail. The proxy server may also cache/store the cookie for subsequent use (e.g., the next time the e-mail is rendered and the dynamic link is resolved) and update the stored cookie as directed by the advertising server.

In a particular embodiment, a method includes receiving, at a proxy server, a first request for advertising content from a computing device, where the first request includes an identifier and where the first request is associated with an e-mail received by the computing device. The method also includes determining, at a processor of the proxy server, whether state information associated with the identifier is available. In response to determining that the state information associated with the identifier is unavailable, the method includes generating the state information associated with the identifier at the proxy server. Alternately, if the state information is available, the proxy server retrieves the state information. The method also includes sending a second request for the advertising content from the proxy server to an advertising server, where the second request includes at least a portion of the state information associated with the identifier. The method also includes receiving the advertising content from the advertising server. For example, the advertising content may correspond to a resolution of a dynamic advertising link included in the e-mail. To illustrate, the advertising content may include a static link to an image file or a webpage. The method further includes sending the advertising content to the computing device.

In another particular embodiment, an apparatus includes a processor, a communications interface, and a memory storing instructions executable by the processor to perform operations. The operations include receiving, at a proxy server, a first request for advertising content from a computing device, where the first request includes an identifier and where the first request is associated with an e-mail received by the computing device. The operations also include determining whether state information associated with the identifier is available. The operations further include, in response to determining that state information associated with the identifier is unavailable, generating the state information associated with the identifier at the proxy server. The operations further include sending a second request for the advertising content from the proxy server to an advertising server, where the second request includes at least a portion of the state information associated with the identifier. The operations also include receiving the advertising content from the advertising server. The operations further include sending the advertising content to the computing device.

In another particular embodiment, a computer-readable storage device stores instructions that, when executed by a computer, cause the computer to perform operations including sending configuration information associated with an advertising campaign to an advertising server. The advertising campaign includes an advertisement to be accessed by web browsers and e-mail clients via dynamic links. The operations further include receiving information regarding resolution of the dynamic links.

DETAILED DESCRIPTION

Figure 1:
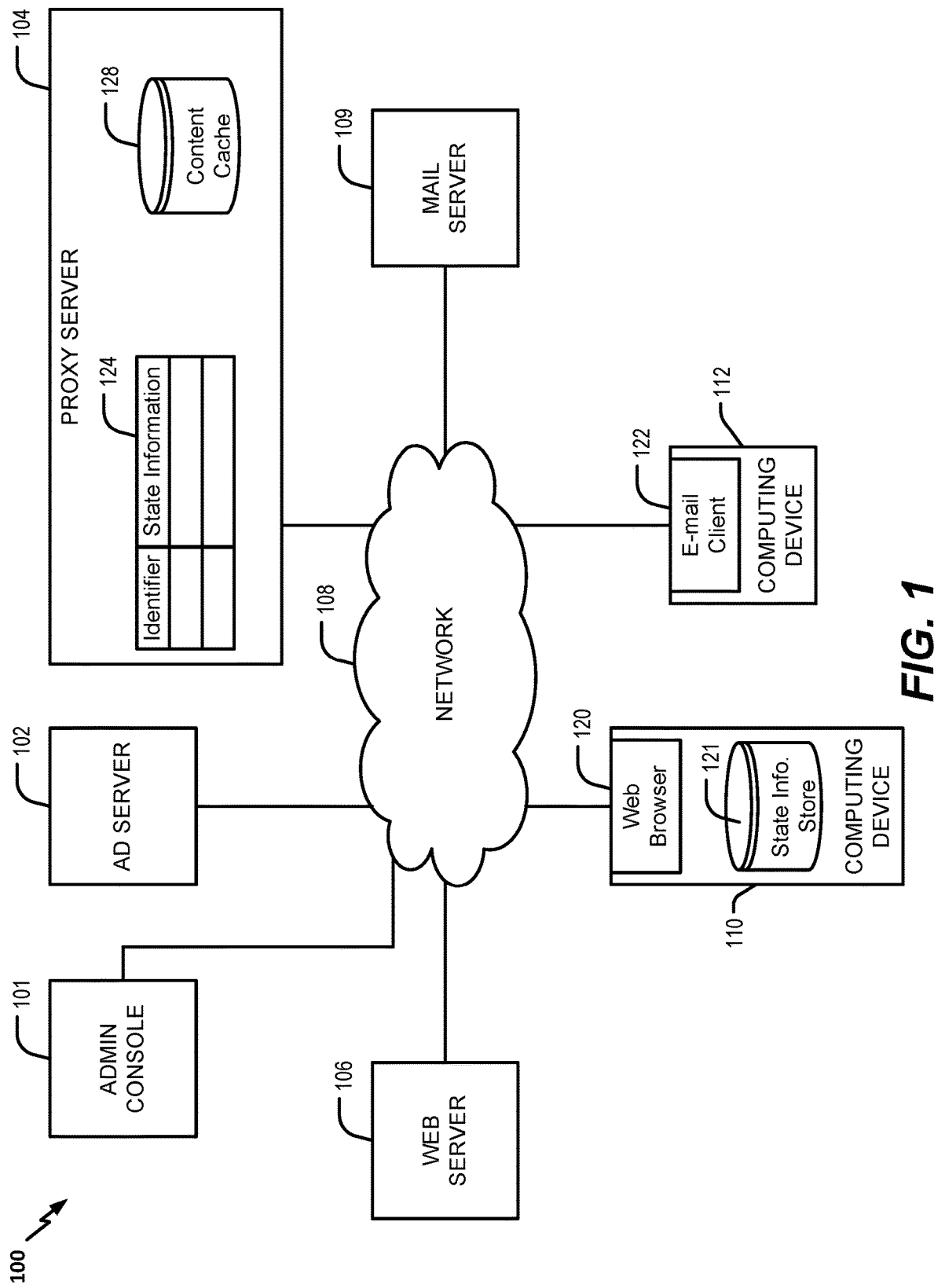
FIG. 1 is a block diagram to illustrate a particular embodiment of a system that is operable to support insertion and presentation of dynamic advertising in e-mails.

FIG. 1 illustrates a particular embodiment of a system 100 that is operable to support insertion and presentation of dynamic advertising in e-mails. In the illustrated example, the system 100 includes a network 108. While a single network cloud is shown, the network 108 may include any topology. For example, the network 108 may include wired and/or wireless network media as well as one or more relay servers. In a particular embodiment, the network 108 includes a local area network (LAN) and/or the Internet. Connected to the network 108 are an administrative (admin) console 101, an advertising (ad) server 102, a proxy server 104, a web server 106, a mail server 109, a first computing device 110, and a second computing device 112, each of which may send and receive data via the network 108. In an illustrative embodiment, the advertising server 102 is a web based advertising server (WBAS). It should be noted that the computing devices 110 and 112 are representative. In alternate embodiments, more than two or fewer than two computing devices may access dynamic advertising via the system 100, as further described herein. Further, different types of computing devices may be included in the system 100.

The proxy server 104 may include a server computing device, a personal computer (e.g., a desktop or laptop computer), a mobile device (e.g., a smartphone or tablet computer), or another type of computing device. In a particular embodiment, the proxy server 104 may include one or more software processes executing on a computing device. In one embodiment, the proxy server 104 may execute on the same computing device as the advertising server 102. Alternately, the proxy server 104 and the advertising server 102 may be different devices, as shown in FIG. 1.

The proxy server 104 may store a table 124 or other data structure that associates dynamic advertising identifiers with state information (e.g., cookies). The proxy server 104 may also include a content cache 128. The table 124 may be stored in memory internal to the proxy server 104 or external to the proxy server 104 (e.g., an external database). Similarly, the content cache 128 may be internal to the proxy server 104 or external to the proxy server 104 (e.g., an external database). One or both of the table 124 and the content cache 128 may be stored in memory within a solid state drive, a hard disk drive, flash memory, or other type of computer-readable storage media or device. The proxy server 104 may communicate with the advertising server 102 on behalf of e-mail clients, as further described herein.

The first computing device 110 may execute a web browser 120 and may include a state information store 121. In a particular embodiment, the state information store 121 corresponds to volatile memory (e.g., random access memory (RAM)) or non-volatile memory (e.g., disk memory) at the first computing device 110. The web browser 120 may be a software application represented using instructions that are executable by one or more processors at the first computing device 110. The second computing device 112 may execute an e-mail client 122. In a particular embodiment, the e-mail client 122 may be a software application (e.g., a post office protocol (POP3), simple mail transfer protocol (SMTP), and/or internet message access protocol (IMAP) based e-mail client) represented using instructions that are executable by one or more processors at the second computing device 112. Alternately, the e-mail client 122 may be a website that is accessed via a web browser executing on the second computing device 112. The first computing device 110 and the second computing device 112 may each be a personal computer, a tablet computer, a mobile phone, or another other type of computing device.

Further, the administrative console 101 and the advertising server 102 may each include a server computing device, a personal computer (e.g., a desktop or laptop computer), a mobile device (e.g., a smartphone or tablet computer), or another type of computing device. The administrative console 101 may be communicably coupled to the advertising server 102 via the network 108, as shown in FIG. 1, or may be directly coupled to the advertising server 102. In a particular embodiment, the administrative console 101 and the advertising server 102 may correspond to one or more software processes running on a single computing device or on different computing devices.

During operation, an advertiser may use the administrative console 101 to create/modify configuration settings corresponding to an advertising campaign. The configuration settings may include information describing dynamic advertising that is to be presented by web browsers and e-mail clients. For example, the configuration settings may indicate who the advertising campaign is to target (e.g., by e-mail address, website name, webpage URL, geographic/demographic information, etc.), what the advertising campaign includes (e.g., image files, video files, audio files, webpages, etc.), when advertising is to be displayed/e-mailed, etc. The configuration settings may be used to generate dynamic advertising links that will be included in webpages served by the web server 106 and in e-mails sent to an e-mail distribution list. Thus, the administrative console 101 may be used to manage a single advertising campaign that presents dynamic advertising via web browsers as well as e-mail clients. The administrative console 101 may also receive and display statistics associated with the advertising campaign, as further described herein. In a particular embodiment, the administrative console 101 may transmit the configuration settings for the advertising campaign to the advertising server 102, the web server 106, and/or the proxy server 104.

While an advertising campaign is active, the advertising server 102 may receive requests to resolve dynamic advertising links associated with the advertising campaign. For example, the web browser 120 on the first computing device 110 may access a particular webpage. The web browser 120 may execute dynamic scripting code included in the webpage. For example, the dynamic scripting code may include JavaScript® code, PHP code, Rails® code, active server pages (ASP) code, hypertext markup language (HTML) script code, etc. JavaScript is a registered trademark of Oracle Corp. of Redwood City, Calif. Rails is a registered trademark of David Heinemeier Hansson of Denmark. The web browser 120 may also store state information (e.g., cookies) in the state information store 121. While accessing the webpage, the web browser 120 may encounter a dynamic link, such as an image link or a jump link. As used herein, an image link is a dynamic link that resolves to an image file or a static link to the image file (e.g., an Internet address of the image file). As used herein, a jump link is a dynamic link (e.g., hyperlink) that resolves to another link. A jump link may also differ from an image link in that a jump link is counted when determining clickthroughs associated with the advertising campaign, as further described herein. In a particular embodiment, an image link and a jump link are associated with the same item on the webpage. For example, HTML code of the webpage may include an "img src" tag and an associated "href" tags. The "img src" tag may include a dynamic image link that is resolved to determine the image file to be displayed by the web browser 120. The "href" tag may be resolved when a user clicks on the image. In a particular embodiment, the web browser 120 receives a cookie from the advertising server 102 in response to an initial request, stores the cookie in the state information store 121, and includes the cookie in subsequent requests to the advertising server 102, so that the advertising server 102 is able to determine that the requests originated from the same web browser 120.

Figure 2:
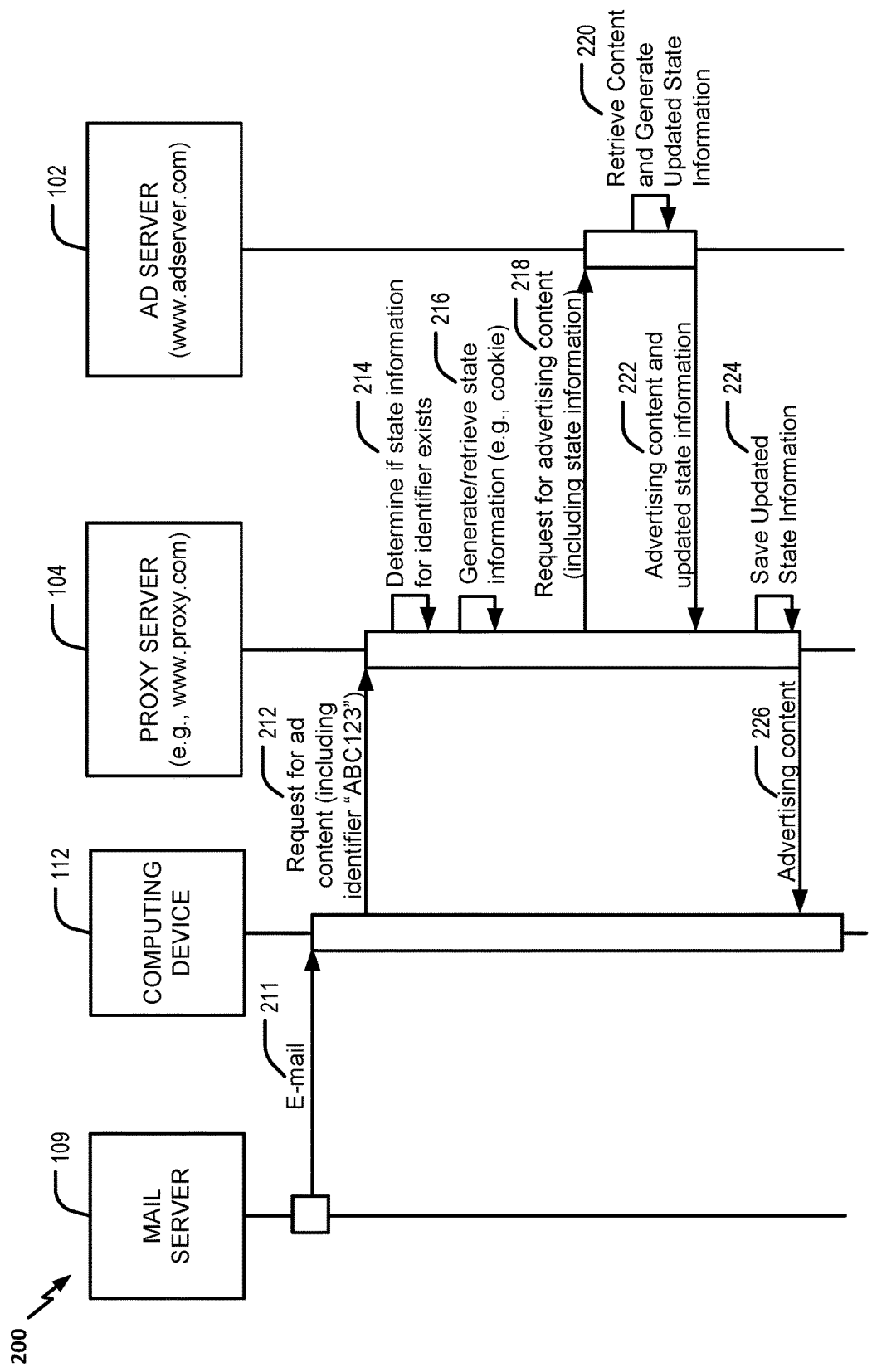
FIG. 2 is a diagram to illustrate a particular embodiment of communication at the system of FIG. 1.

The advertising server 102 may also receive requests from the proxy server 104. FIG. 2 illustrates an embodiment messaging of 200 at the system 100 of FIG. 1, including transmission of a request from the proxy server 104 to the advertising server 102. After the administrative console 101 is used to configure the advertising campaign, e-mails may be sent to one or more e-mail addresses. The mail server 109 may receive an e-mail sent to the e-mail address of a user associated with the second computing device 112. In a particular embodiment, the e-mail is part of a large-scale e-mail advertising distribution (e.g., more than one hundred thousand e-mails sent). The user may use the e-mail client 122 to access the e-mail. For example, the e-mail client 122 may be a website that is used to view the e-mail hosted at the mail server 109. As another example, the e-mail client 122 may download an e-mail 211 from the mail server 109 to the second computing device 112, as shown in FIG. 2.

The e-mail 211 may include dynamic advertising content, such as image links and/or jump links. Whereas the image links and jump links encountered by the web browser 120 of FIG. 1 point to the advertising server 102, the image links and jump links included in the e-mail 211 point to the proxy server 104. The image links and jump links may also include an identifier that uniquely identifies the user, the user's e-mail address, the e-mail 211, the second computing device 112, the advertising campaign, a particular advertisement or advertised product, or any combination thereof.

For example, the image links and jump links may point to the domain "www.proxy.com" and may include the identifier "ABC123." When the e-mail 211 is displayed, the e-mail client 122 may attempt to resolve an image link by sending a request 212 for advertising content to the proxy server 104, where the request 212 includes the identifier "ABC123." To illustrate, the request may be a hypertext transfer protocol (HTTP) Get request to "www.proxy.com/img/ABC123." The request 212 may also include the address of the advertising server 102 (e.g., www.adserver.com) as a parameter.

Upon receiving the request 212, the proxy server 104 may determine whether state information (e.g., a cookie) associated with the identifier "ABC123" is available, at 214. For example, the proxy server 104 may search for the identifier "ABC123" in the table 124 of FIG. 1 (or in an external database when the table 124 is not stored at the proxy server 104). If valid (e.g., unexpired) state information for the identifier "ABC123" exists in the table 124, the proxy server 104 may retrieve the state information. Alternately, in response to determining that the state information is unavailable, the proxy server 104 may generate the state information. For example, the proxy server 104 may create a new record in the table 124 for a newly created cookie and ordinal ("ord") value. The record may be keyed to (e.g., retrievable using) the identifier "ABC123." In a particular embodiment, the ordinal value is based on the identifier and a timestamp of the request 212. For example, the ord value may be of the format "ord=ABC123_timestamp." The proxy server 104 may initialize the cookie with default/test values. For example, the cookie may be initialized with default values as follows: "Cookie: 'test_cookie= CheckForPermission; path=/; domain=.adserver.com; expires=Thu, 10 Jan. 2013 22:18:46 GMT'."

After generating or retrieving the state information, at 216, the proxy server 104 may transmit a second request 218 for advertising content to the advertising server 102 (e.g., at www.adserver.com), where the second request 218 includes the state information. The advertising server 102 may respond to the second request 218 by retrieving the requested advertising content (e.g., an image uniform resource locator (URL)), at 220. The advertising server 102 may also generate updated state information, such as updated cookie values. The advertising server 102 may send the requested advertising content and updated state information to the proxy server 104, as shown at 222. For example, when an image link is being resolved, the advertising content may correspond to an image file or a static link (e.g., Internet address) of an image file.

The proxy server 104 may store the updated state information received from the advertising server 102, at 224. For example, the proxy server 104 may overwrite at least a portion of the stored cookie in the table 124 with updated values. In a particular embodiment, the proxy server 104 stores the updated cookie with a time to live (TTL) (e.g., validity time period). The TTL may be configurable by the proxy server 104 or the advertising server 102. In an illustrative embodiment, the TTL is 824 hours. The proxy server 104 may also send the received advertising content to the second computing device 112, as shown at 226, so that the e-mail client 122 can retrieve and display the advertising image included in the e-mail 211.

In a particular embodiment, the proxy server 104 caches advertising content (e.g., image URL) received from the advertising server 102 in the content cache 128, so that the advertising content can be "locked in" for the e-mail client 122. To illustrate, after the advertising content is cached by the proxy server 104, if the e-mail client 122 sends another request for the same advertising content (e.g., another request for "www.proxy.com/img/ABC123"), the proxy server 104 may send the cached advertising content to the e-mail client 122 as long as the cookie associated with the identifier "ABC123" is valid. The proxy server 104 may thus correlate multiple requests from the same e-mail client and ensure that the same image URL is returned to the e-mail client during the lifetime of a cookie.

In a particular embodiment, a user may click on the advertising image displayed by the e-mail client 122. Clicking on the image may trigger resolution of a jump link (e.g., "www.proxy.com/jump/ABC123") associated with the image. For example, clicking on the image may cause the second computing device 120 to launch a web browser, and the web browser may send a request for "www.proxy.com/jump/ABC123" to the proxy server 104. As explained above, an initial request from a web browser to the advertising server 102 would typically cause the advertising server 102 to generate a new cookie. In contrast, because the web browser sends the request to the proxy server 104 and not the advertising server 102, the proxy server 104 may determine whether a record for "ABC123" exists in the table 124. Typically, such a record exists due to previous resolution of the image link, and the proxy server 104 retrieves the corresponding cookie and ord value stored in the table 124 for inclusion in a request to the advertising server 102 to resolve the jump link, thereby coordinating image link resolution and jump link resolution for the e-mail client 122. The advertising server 102 may respond to the proxy server with an HTML 301 "Moved Temporarily" Response or an HTML 302 "Moved Permanently" Response that includes a resolution of the jump link (e.g., a URL of an advertiser's website). The proxy server 104 may cache the destination link in the content cache 128 and send the destination link to the web browser at the computing device 112.

Occasionally, however, a record for "ABC123" may not exist in the table 124. For example, this may occur when the cookie TTL established during resolution of the image link expires before the user clicks on the image. When a record for "ABC123" does not exist, proxy server 104 may resolve the jump link to a default landing webpage. Alternately, the proxy server 104 may retrieve a stored destination link that is associated with another identifier. For example, in addition to the user of the computing device 112, a second e-mail for the same advertised product may have been sent to a second user. The second e-mail may have contained a second identifier "ABC456," and the second user may have clicked on the advertisement image prior to expiration of a TTL associated with the second user's cookie. Thus, a jump link may have been successfully resolved for the second user. Because the e-mails were for the same advertised product, returning the jump link resolution for the second user to the first user may be preferable to returning an error or a default landing page to the first user. Thus, when a cookie for one user has expired, the proxy server 104 may proactively resolve a jump link (or image link) using cached information corresponding to another user.

In a particular embodiment, the proxy server 104 may collect statistics regarding the resolution of dynamic advertising links. For example, each time the proxy server 104 receives a "click" (e.g., jump link resolution request), the proxy server 104 may increment a counter associated with the identifier included in the request. The proxy server 104 may also increment an aggregate counter associated with a corresponding e-mail newsletter, advertising campaign, etc. Thus, the proxy server 104 may track image calls per user/campaign, image/jump sequences completed within a cookie TTL, image calls within a cookie TTL, jump link calls outside of a cookie TTL, etc. In a particular embodiment, the proxy server 104 may dynamically increase or decrease cookie TTL, or request that the advertising server 102 increase or decrease cookie TTL, based on the values of the counters. For example, if a large number of image calls or jump link calls are occurring outside of a cookie TTL, the cookie TTL may be increased. The proxy server 104 may also provide the collected statistics to the administrative console 101 of FIG. 1. Similar statistics regarding "clicks" may be provided to the administrative console 101 by the web server 106 of FIG. 1. The administrative console 101 may thus receive information regarding resolution of dynamic advertising links, including a first number of times that advertisements associated with an advertising campaign have been accessed by web browsers and second a number of times that the same advertisements associated with the same advertising campaign have been accessed by e-mail clients, where the second number of times is determined based at least in part on state information received from the proxy server 104.

The proxy server 104 of FIGS. 1-2 may thus enable e-mail based dynamic advertising. Advantageously, the proxy server 104 may enable clients that do not support client-side scripting/storage to interact with servers that require client-side scripting/storage. Further, use of the proxy server 104 may enable an advertiser to implement, manage, and evaluate a single advertising campaign for both browsers and e-mails.

Figure 3:
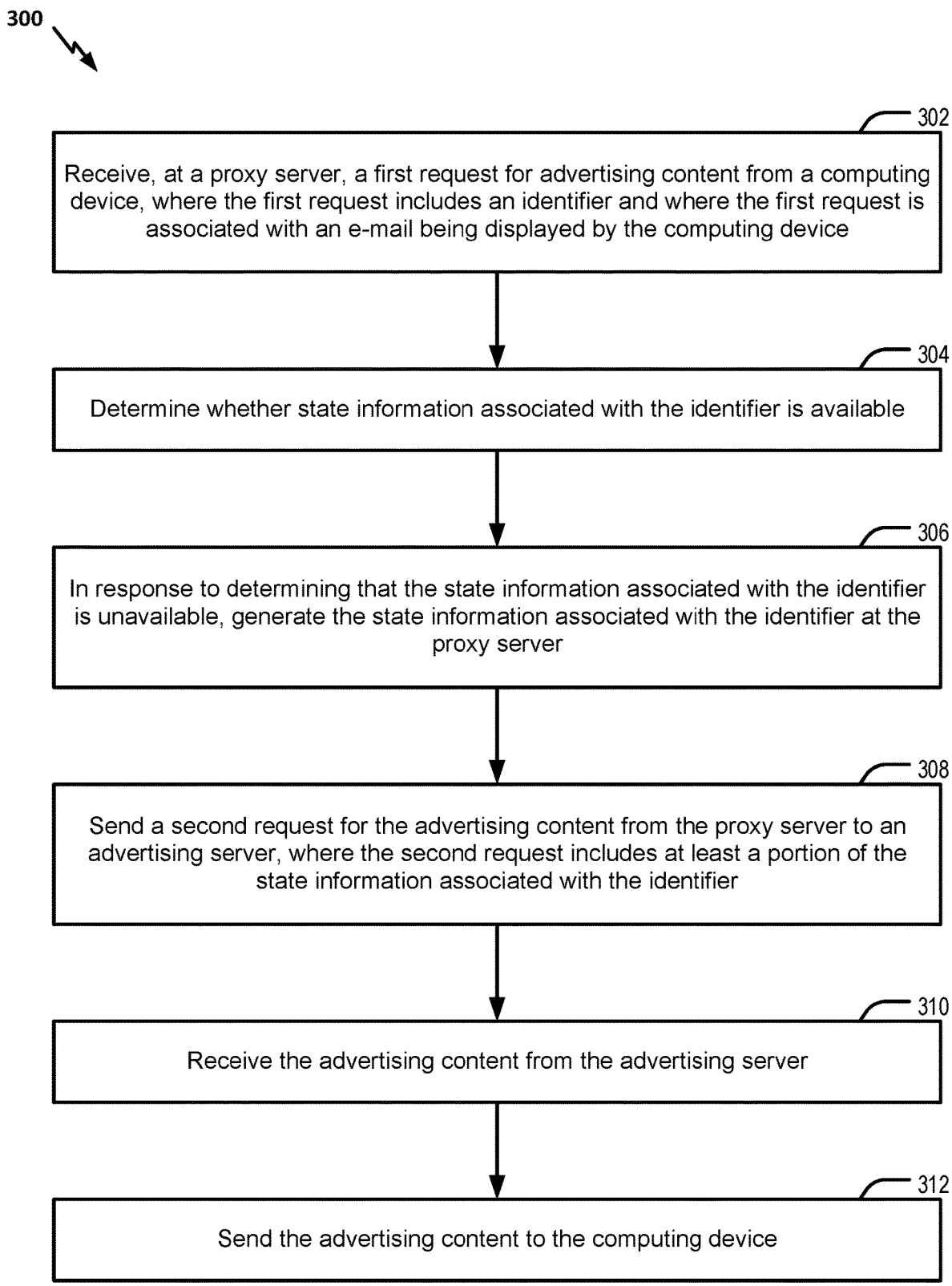
FIG. 3 is a flowchart to illustrate a particular embodiment of a method of operation at the system of FIG. 1.

FIG. 3 is a flowchart to illustrate a particular embodiment of a method 300 of operation at a proxy server. In an illustrative embodiment, the method 300 may be performed by the proxy server 104 of FIGS. 1-2. For example, the method 300 may be performed by a processor integrated into the proxy server 104 during execution by the processor of instructions stored in a memory of the proxy server 104.

The method 300 may include receiving, at a proxy server, a first request for advertising content from a computing device, at 302. The first request may include an identifier and may be associated with an e-mail being displayed by the computing device. For example, referring to FIG. 2, the proxy server 104 may receive the request 212 from the computing device 112, where the request includes the identifier "ABC123."

The method 300 may also include determining whether state information associated with the identifier is available, at 304. For example, referring to FIG. 2, the proxy server 104 may search the table 124 to determine, at 214, whether a valid cookie associated with the identifier "ABC123" is stored in the table 124. The method 300 may further include, in response to determining that the state information associated with the identifier is unavailable, generating the state information associated with the identifier at the proxy server, at 306. For example, referring to FIG. 2, the proxy server 104 may generate a new cookie associated with the identifier "ABC123," at 216. Alternately, when the state information is available, the proxy server 104 may retrieve the state information (e.g., from the table 124).

The method 300 may include sending a second request for the advertising content from the proxy server to an advertising server, at 308. The second request may include at least a portion of the state information associated with the identifier. For example, referring to FIG. 2, the proxy server 104 may send the second request 212 to the advertising server 102. The method 300 may also include receiving the advertising content from the advertising content, at 310, and sending the advertising content to the computing device, at 312. For example, referring to FIG. 2, the proxy server 104 may receive the advertising content, at 222, and send the advertising content to the computing device 112, at 226. In a particular embodiment, the proxy server may also cache the advertising content. Further, the proxy server 104 may receive and store updated cookie information, as shown at 224.

Figure 4:
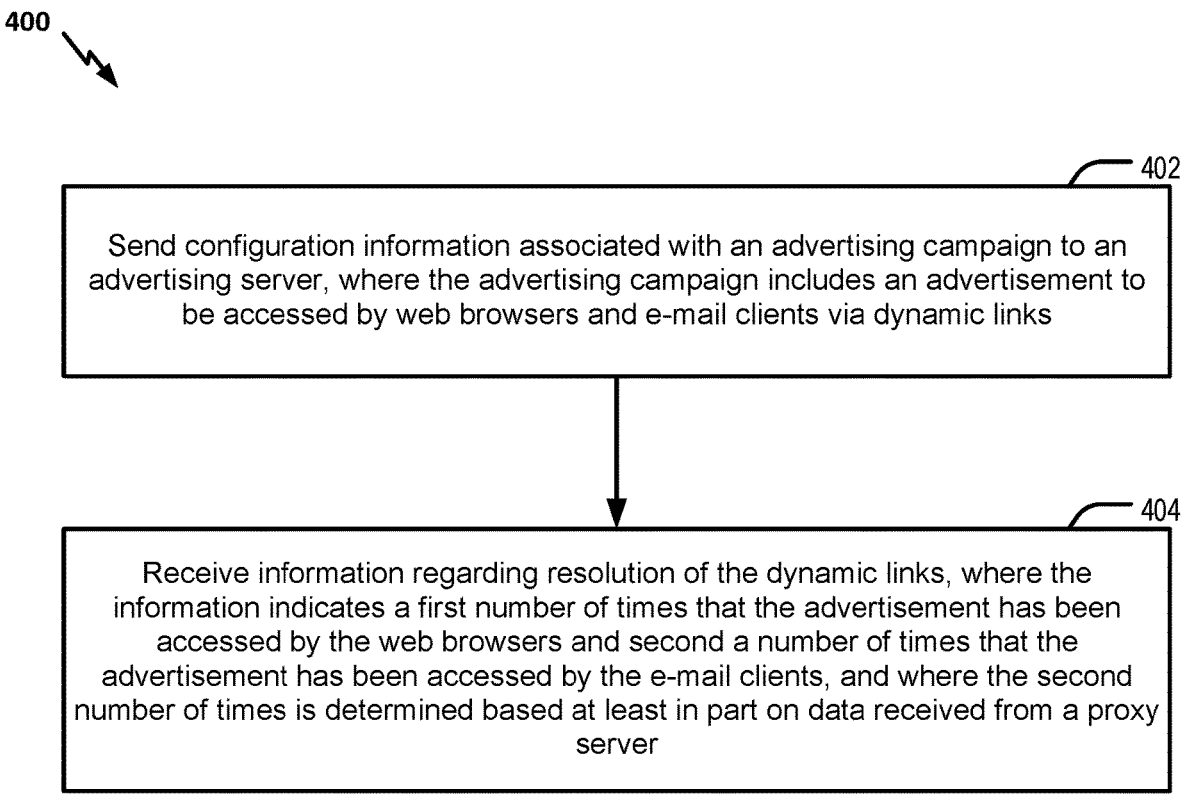
FIG. 4 is a flowchart to illustrate another particular embodiment of a method of operation at the system of FIG. 1.

FIG. 4 is a flowchart to illustrate an embodiment of a method 400 of operation at a dynamic advertising management entity. In an illustrative embodiment, the method 400 may be performed by the administrative console 101 of FIG. 1.

The method 400 may include sending configuration information associated with an advertising campaign to an advertising server, at 402. The advertising campaign may include an advertisement to be accessed by web browsers and e-mail clients via dynamic links. For example, referring to FIG. 1, the administrative console 101 may send configuration information regarding an advertising campaign to the advertising server 102.

The method 400 may also include receiving information regarding resolution of the dynamic links, at 404. The information may indicate a first number of times that the advertisement has been accessed by the web browsers. The information may also indicate a second number of times that the advertisement has been accessed by the e-mail clients, where the second number of times is determined based at least in part on data received from a proxy server. For example, referring to FIG. 1, the administrative console 101 may receive such statistics from the web server 106 and the proxy server 104. The first number of times may be determined based on data received from sources other than the proxy server 104 (e.g., based on data received from the web server 106). The second number of times may be determined based on data received from the proxy server 104. In an illustrative embodiment, the administrative console 101 may generate display the statistics in one or more graphical user interfaces (GUIs) for analysis. For example, the GUIs may enable an advertiser to determine relative success rates of the web browser advertisements, the e-mail advertisements, and the advertising campaign as a whole.

Figure 5:
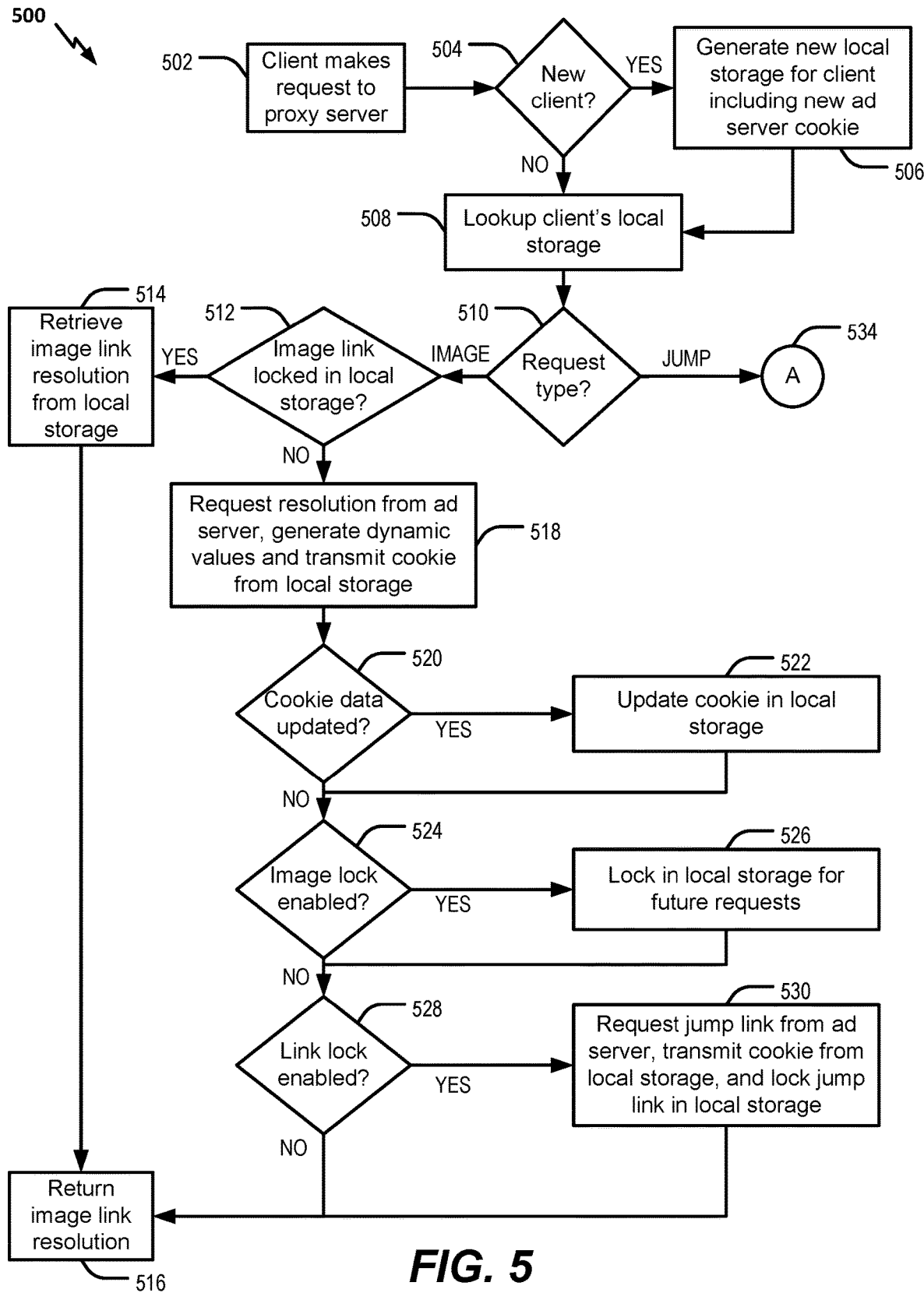
FIG. 5 and FIG. 6 collectively depict a flowchart to illustrate another particular embodiment of a method of operation at the system of FIG. 1.
Figure 6:
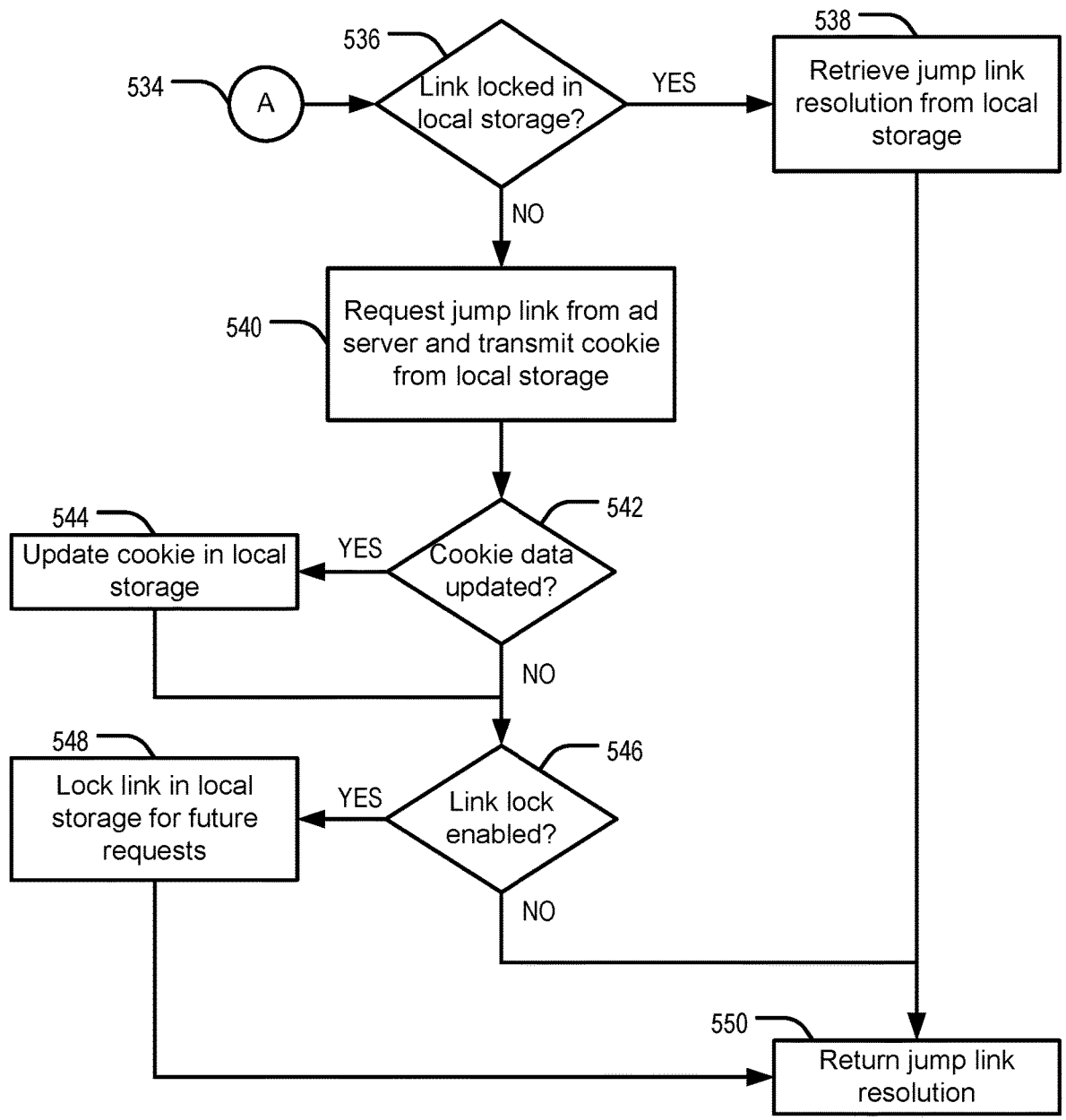

FIG. 5 and FIG. 6 collectively depict a flowchart to illustrate a particular embodiment of a method 500 operation in accordance with the described techniques. At 502, a client (e.g., the e-mail client 122 of FIG. 1) may send a request (e.g., the request 212 of FIG. 2) to a proxy server (e.g., the proxy server 104 of FIGS. 1-2). Advancing to 504, the proxy server may determine whether the client is a "new" client. For example, the proxy server may determine whether the client is a new client based on whether a valid cookie is available for an identifier included in the request from the client. If the client is a new client (e.g., if no such cookie is available), the proxy server may generate locally stored data for the client, including a new cookie, at 506.

If the client is not a new client, or after generating the new cookie, the proxy server may perform a lookup operation based on the client's identifier to identify the corresponding cookie, at 508, and determine whether the request received from the client is a request to resolve an image link or a jump link, at 510. If the request is a request to resolve a jump link, the method 500 may advance to FIG. 6, at 534. If the request is a request to resolve an image link, the proxy server may determine whether the image link is locked at the proxy server, at 512. As used herein, an item may be considered "locked" with respect to a user or user identifier if the item is being maintained (e.g., stored or cached) for that user or user identifier. To illustrate, the proxy server 104 may determine if an image link corresponding to the request 212 is locked based on whether or not a resolution of the image link (e.g., an image file or a link to an image file) is cached in the content cache 128 for the identifier included in the request 212. If the image link is locked, the proxy server may retrieve the resolution of the image link from local storage, at 514, and send the resolution to the client, at 516.

If image link is not locked, the proxy server may request resolution of the image link from an advertising server, at 518, which may include generating and/or transmitting cookie values from local storage of the proxy server. The proxy server may receive a response from the advertising server and, continuing to 520, may determine whether the response indicates that the cookie data is to be updated. Advancing to 522, if the cookie data is to be updated, the proxy server may update the cookie stored at the proxy.

Proceeding to 524, the proxy server may determine whether the image link being resolved is to be locked for the identifier. For example, the proxy server may make such a determination based on information received from the advertising server, information included in the request from the client, and/or configuration information stored at the proxy server. If image lock is enabled, the proxy server may, at 526, lock the image link resolution in local storage for use in resolving future requests to resolve the same or similar image links.

Continuing to 528, the proxy server may proactively determine whether jump link locking is to be enabled, even though the link being resolved is an image link, not a jump link. As described with reference to FIGS. 1-2, an image link may be associated with a corresponding jump link. For example, the image link may dynamically determine what image is downloaded and displayed by an e-mail client when an e-mail is rendered for display, and the corresponding jump link may dynamically determine what webpage is accessed if a user clicks on the image. If jump link locking is enabled, the proxy server may proactively resolve the associated jump link using the same identifier as in the image link resolution request, at 530. For example, the proxy server may send a request to the advertising server, including transmitting the cookie from local storage as part of the request. The proxy server may lock the jump link by caching the resolution of the jump link in local storage. Advancing to 516, the proxy server may return the image link resolution to the client.

Referring to FIG. 6, when the request received from the client is a request to resolve a jump link, the proxy server may determine if a resolution to the jump link is locked (e.g., already cached) in local storage, at 536. If so, the proxy server may retrieve the resolution from local storage, at 538, and send the resolution to the client, at 550.

Advancing to 540, if the jump link is not locked, the proxy server may request resolution of the jump link from the advertising server, including transmitting the cookie from local storage. The proxy server may receive a response from the advertising server and, continuing to 542, determine whether the response indicates that the cookie data is to be updated. Advancing to 544, if the cookie data is to be updated, the proxy server may update the cookie stored at the proxy server.

Proceeding to 546, the proxy server may determine whether the jump link being resolved is to be locked for the identifier. For example, the proxy server may make such a determination based on information received from the advertising server, information included in the request from the client, and/or configuration information stored at the proxy. If link lock is enabled, the proxy server may, at 548, lock the jump link resolution (e.g., a static link to a webpage) in local storage for use in resolving future requests to resolve the same or similar image links. Advancing to 550, the proxy server may return the jump link resolution to the client.

The method 500 of FIGS. 5-6 may thus enable e-mail based dynamic advertising. For example, the method 500 of FIGS. 5-6 may provide clients that do not support client-side scripting/storage the ability to interact with servers that require client-side scripting/storage.

Figure 7:
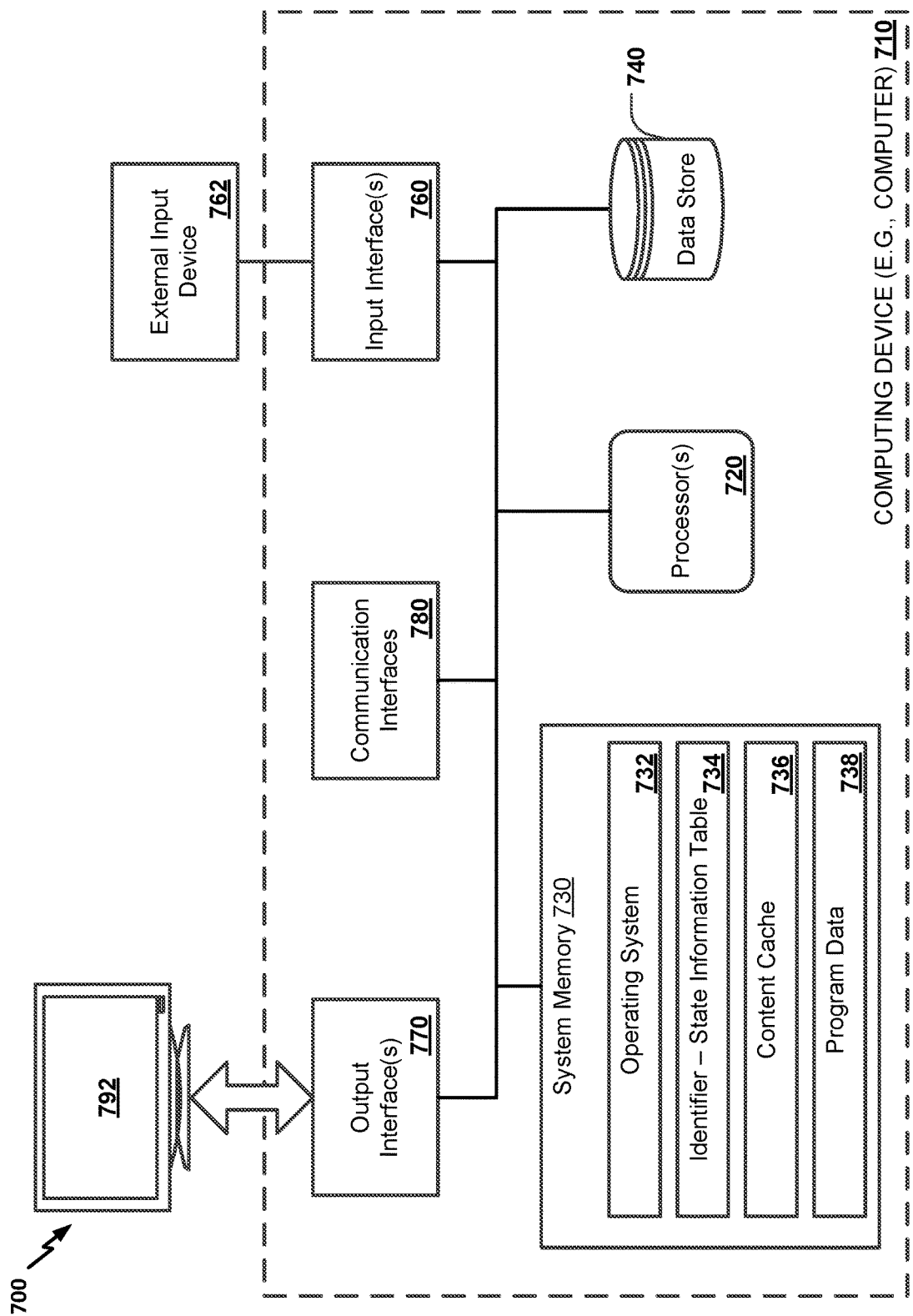
FIG. 7 is a block diagram of an illustrative embodiment of a general computer system operable to support embodiments of computer-implemented methods, computer program products, and system components as illustrated in FIGS. 1-6.

FIG. 7 is a block diagram of a computing environment 700 including a computing device 710 that is operable to support embodiments of computer-implemented methods, computer program products, and system components according to the present disclosure.

The computing device 710 includes at least one processor 720 and a system memory 730. For example, the computing device 710 may be a desktop computer, a laptop computer, a tablet computer, a server computing device (e.g., a proxy server), a cloud computing device, or any other fixed or mobile computing device. Depending on the configuration and type of computing device, the system memory 730 may include volatile (such as random access memory or "RAM"), non-volatile (such as read-only memory or "ROM," flash memory, and similar memory devices that maintain stored data even when power is not provided), a combination thereof, or some other memory. The system memory 730 may store an operating system 732 and program data 738. When the computing device 710 is a proxy server (e.g., the proxy server 104 of FIGS. 1-2), the system memory 730 may also store an identifier-to-state information table 734 and a content cache 736. In an illustrative embodiment, the identifier-to-state information table 734 is the table 124 of FIG. 1 and the content cache 736 is the content cache 128 of FIG. 1. Alternately, when the computing device 710 is a user device or a client device, such as the first computing device 110 of FIG. 1 or the second computing device 112 of FIGS. 1-2, the system memory 730 may store instructions and data corresponding to a web browser (e.g., the web browser 120) and/or an e-mail client (e.g., the e-mail client 122).

The computing device 710 may also have additional features or functionality. For example, the computing device 710 may also include removable and/or non-removable additional data storage devices, such as magnetic disks, optical disks, tape, and memory cards. Such additional storage devices are illustrated in FIG. 7 by a data store 740. Computer-readable or processor-readable storage media may include volatile and/or non-volatile storage and removable and/or non-removable media implemented using any technology for storage of information such as computer-readable instructions, data structures, program components or other data. The system memory 730 and the data store 740 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 710. Any such computer storage media may be part of the computing device 710.

The computing device 710 may also have one or more input devices, such as an external input device 762 connected via one or more input interfaces 760. One or more output devices, such as an illustrative display device 792, speakers, a printer, etc. may also be connected to the computing device 710 via one or more output interfaces 770. The input interfaces 760 and the output interfaces 770 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In certain embodiments, such as when the computing device 710 is the proxy server 104, the input interfaces 760 and the output interfaces 770 may not be included. The computing device 710 may also include one or more communication interfaces 780 that enable the computing device 710 to communicate (e.g., via a network) with other computing devices.

It will be appreciated that not all of the components or devices illustrated in FIG. 7 or otherwise described in the previous paragraphs are necessary to support embodiments as herein described. It will also be appreciated that the computing device 710 may have additional or different components or devices than illustrated in FIG. 7 or otherwise described in the previous paragraphs.

Although the exemplary embodiments described herein are intended to enable a person skilled in the art to practice such embodiments, it should be understood that other embodiments may be realized and that logical and physical changes may be made without departing from the scope of the present disclosure. Thus, the detailed description herein is presented for purposes of illustration only.

In one embodiment, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various embodiments.

The Abstract is not intended to be used in interpreting or limiting the scope or meaning of the claims. In addition, the disclosure is not to be interpreted as indicating that the claimed embodiments require more features than are expressly recited in each claim. Thus, the present disclosure is not intended to be limited to the embodiments shown herein but is to be accorded the widest scope possible consistent with the principles and novel features as defined by the following claims.

What is claimed is:

1. A method comprising:
receiving, at a proxy server, a first request for content from a computing device, wherein the first request is responsive to display of an e-mail directed to an e-mail address of a user and received by the computing device, wherein the first request includes an identifier that uniquely identifies the user and the e-mail;
in response to receiving the first request from the computing device, sending a second request from the proxy server to a first server, wherein the second request includes at least a portion of a cookie associated with the identifier;
receiving the content at the proxy server from the first server;
sending the content from the proxy server to the computing device; and
subsequent to receiving the first request, determining, at the proxy server, information regarding resolution of dynamic links associated with the content, wherein the information regarding resolution of the dynamic links comprises a count of a number of times that the content has been accessed outside a time to live (TTL) of the cookie by web browsers or by e-mail clients.

2. The method of claim 1, wherein a TTL of a second cookie associated with presentation of the content to a particular client is dynamically increased or decreased based on the count.

3. The method of claim 2, wherein the TTL of the second cookie is dynamically increased or decreased by the proxy server.

4. The method of claim 2, further comprising sending, from the proxy server to the first server, an update request to dynamically increase or decrease the TTL of the second cookie.

5. The method of claim 2, further comprising dynamically increasing, at the proxy server, the TTL of the second cookie in response to determining that the count is greater than or equal to a count threshold.

6. The method of claim 1, wherein the first request comprises a request to resolve an image link included in the e-mail.

7. The method of claim 1, wherein the first request comprises a request to resolve a jump link included in the e-mail, the jump link associated with an image link included in the e-mail.

8. The method of claim 1, further comprising storing the cookie at the proxy server on behalf of the computing device.

9. The method of claim 8, further comprising:
storing, at the proxy server, data that maps the identifier to the cookie;
receiving, at the proxy server, a third request from the computing device, wherein the third request includes the identifier;
identifying the cookie based on the data mapping the identifier to the cookie; and
sending a fourth request from the proxy server to the first server, wherein the fourth request includes the cookie.

10. The method of claim 8, further comprising:
receiving an updated cookie from the first server in response to the second request; and
overwriting at least a portion of the cookie with the updated cookie.

11. The method of claim 1, further comprising:
determining, at the proxy server based on the identifier, whether the cookie managed by the proxy server and associated with the identifier is available; and
in response to determining that the cookie associated with the identifier is unavailable, generating the cookie associated with the identifier at the proxy server.

12. The method of claim 1, further comprising storing the content at the proxy server.

13. The method of claim 12, further comprising:
receiving a third request from a requesting device, the third request received after the content is stored at the proxy server, wherein the third request includes a second identifier that uniquely identifies a second user and the e-mail;
determining that a second cookie associated with the second identifier is unavailable; and
in response to determining that the second cookie is unavailable, retrieving the stored content and sending the retrieved content to the requesting device in response to the third request.

14. The method of claim 1, wherein determining whether the cookie is available in an external database.

15. The method of claim 1, wherein the first request comprises an image request, wherein the content comprises an image, and further comprising:
storing the image at the proxy server;
storing a destination link to be accessed in response to receiving a user selection of the image; or
a combination thereof.

16. An apparatus comprising:
a processor;
a communications interface; and
memory, wherein the memory stores instructions executable by the processor to perform
operations comprising:
receiving a second request for content at a first server from a proxy server, the
second request responsive to a first request received at the proxy server from a computing device, wherein the second request includes at least a portion of a cookie associated with an identifier, and wherein the identifier uniquely identifies a user and an email directed to an e-mail address of the user;
sending the content from the first server to the proxy server;
receiving an update request at the first server from the proxy server, the update
request based on a count of a number of times that the content has been accessed outside a time to live (TTL) of the cookie by web browsers or by e-mail clients; and
in response to receiving the update request, dynamically updating a TTL of a
second cookie associated with presentation of the content to a particular client, wherein the TTL of the second cookie is dynamically updated based on the count.

17. The apparatus of claim 16, wherein the first request includes an address of the proxy server, and wherein the second request includes an address of the first server.

18. The apparatus of claim 16, wherein the second request further comprises an ordinal value, the ordinal value based in part on the identifier.

19. A computer-readable storage device storing instructions that, when executed by a computer, cause the computer to perform operations comprising:

receiving, at a proxy server, a first request for content from a computing device, wherein
the first request is responsive to display of an e-mail directed to an e-mail address of a user and received by the computing device, wherein the first request includes an identifier that uniquely identifies the user and the e-mail;
in response to receiving the first request from the computing device, sending a second
request from the proxy server to a first server, wherein the second request includes at least a portion of a cookie associated with the identifier;
receiving the content at the proxy server from the first server;
sending the content from the proxy server to the computing device; and
subsequent to receiving the first request, determining, at the proxy server, information
regarding resolution of dynamic links associated with the content, wherein the information regarding resolution of the dynamic links comprises a count of a number of times that the content has been accessed outside a time to live (TTL) of the cookie by web browsers or by e-mail clients, and wherein a TTL of a second cookie associated with presentation of the content to a particular client is dynamically increased or decreased based on the count.

20. The computer-readable storage device of claim 19, wherein the operations further comprise increasing, at the proxy server, the TTL of the second cookie in response to determining that the count is greater than or equal to a count threshold.

\* \* \* \* \*